United States Patent
Cheng et al.

(10) Patent No.: US 7,634,666 B2
(45) Date of Patent: Dec. 15, 2009

(54) CRYPTO-ENGINE FOR CRYPTOGRAPHIC PROCESSING OF DATA

(75) Inventors: Lee Ming Cheng, Hong Kong (HK); Ting On Ngan, Hong Kong (HK); Ka Wai Hau, Hong Kong (HK)

(73) Assignee: Cityu Research Limited, Kowloon, Hong Kong (HK)

( * ) Notice: Subject to any disclaimer, the term of this patent is extended or adjusted under 35 U.S.C. 154(b) by 509 days.

(21) Appl. No.: 10/641,869

(22) Filed: Aug. 15, 2003

(65) Prior Publication Data

US 2005/0036617 A1    Feb. 17, 2005

(51) Int. Cl.
 G06F 17/10 (2006.01)
(52) U.S. Cl. .................. 713/191; 713/189; 713/192; 380/30
(58) Field of Classification Search ............... None
 See application file for complete search history.

(56) References Cited

U.S. PATENT DOCUMENTS 4,316,055 A    2/1982   Feistel
4,484,301 A *  11/1984  Borgerding et al. ......... 708/632
4,891,781 A *   1/1990  Omura .................... 708/670
6,230,179 B1*   5/2001  Dworkin et al. ............ 708/492
6,397,241 B1*   5/2002  Glaser et al. .............. 708/625
6,671,709 B2*  12/2003  Glaser et al. .............. 708/492
7,027,597 B1*   4/2006  Stojancic et al. ............ 380/28
7,277,540 B1*  10/2007  Shiba et al. ................ 380/28

FOREIGN PATENT DOCUMENTS

WO     WO 00/46954      8/2000

OTHER PUBLICATIONS

Pseudorandom Generator Based on Clipped Hopfield Neural Network; IEEE 1998; Cheng Et Al.

* cited by examiner

*Primary Examiner*—Jung Kim
(74) *Attorney, Agent, or Firm*—Alix, Yale & Ristas, LLP

(57) ABSTRACT

A crypto-engine for cryptographic processing has an arithmetic unit and an interface controller for managing communications between the arithmetic unit and a host processor. The arithmetic unit has a memory unit for storing and loading data and arithmetic units for performing arithmetic operations on the data. The memory and arithmetic units are controlled by an arithmetic controller.

11 Claims, 8 Drawing Sheets

CRYPTO-ENGINE FOR CRYPTOGRAPHIC PROCESSING OF DATA

BACKGROUND OF THE INVENTION

1. Field of the Invention

The invention relates to crypto-engines for cryptographic processing of data. More particularly, the invention relates to a crypto-engine capable of executing either Rivest-Shamir-Adleman (RSA) or Elliptic Curve Cryptography (ECC) public key encryption protocols.

2. Description of Prior Art

The RSA public-key cryptosystem devised by Rivest, Shamir and Adleman and the EEC cryptosystem devised by Koblitz and Miller are two common algorithms adopted by public key infrastructures.

RSA involves a computation of the exponentiation and modulo of product of two large prime numbers whereas ECC is based on computations with points on an elliptic curve. To achieve faster speed, hardware architectures are normally used to implement these algorithms.

In RSA, the main basic operation is the modular multiplication. When the ECC is implemented over the field GF(p), where p is a large prime number, the main basic operations are also modular multiplication. Thus the two algorithms share a common operation. However, in known hardware architectures resources cannot be shared by the algorithms and reused.

SUMMARY OF THE INVENTION

It is an object of the present invention to provide a hardware based crypto-engine for asymmetric cryptograhic processing using RCA or ECC algorithms. It is a further object of the invention to provide a crypto-engine that operates as a coprocessor to a host processor.

According to the invention there is provided a crypto-engine for cryptographic processing of data comprising an arithmetic unit operable as a co-processor for a host processor and an interface controller for managing communications between the arithmetic unit and host processor, the arithmetic unit including:

a memory unit for storing and loading data, a multiplication unit, an addition unit and a sign inversion unit for performing arithmetic operations on said data, and an arithmetic controller for controlling the storing and loading of data by the memory unit and for enabling the multiplication, addition and sign inversion units.

Preferably, the memory unit comprises:

an input switch for selecting input/interim data, a plurality of Static Random Access Memory elements for receiving and storing the input/interim data from the input switch, a plurality of output switches connected to the memory elements, and an address controller for controlling flow of the data through the switches and memory elements.

Preferably, the multiplication unit comprises:

a register to pre-store the multiplier data, a pair of multiplication elements for performing multiplication, a shift register to load the multiplier data bitwise into the multiplication elements, and a first-in-first-out register for synchronizing data movement between the multiplication elements.

Preferably, the multiplication elements comprise a bitwise segmented multiplier, a bitwise segmented multiplicand, and a modulo for performing modular multiplication of the multiplier and multiplicand according to the modulo value.

Preferably, the interface controller comprises a bus interface for connecting high frequency manipulated data inside the arithmetic unit with the lower frequency manipulated data in the host processor, a concatenater/splitter for merging or splitting data width, and a cryptographic controller for generating status and interrupt signals for the host processor and having a op-code generator for generating the op-code signals for the arithmetic unit to select RSA or ECC operations and to synchronize the timing discrepancy of heterogeneous processing.

Further aspects of the invention will become apparent from the following description, which is given by way of example only.

BRIEF DESCRIPTION OF THE DRAWINGS

Embodiments of the invention will now be described by way of example only and with reference to the accompanying drawings in which.

DESCRIPTION OF THE PREFERRED EMBODIMENTS

In the invention a common architecture platform for the two algorithms, RSA and ECC, whose inputs are taken in two different forms, is used to manipulate the two asymmetric encryption algorithms. In the preferred embodiment the combining function is restricted to the computational engine, i.e. modular manipulation. This relies heavily on the low-bit, say 8 bit, processor software to complete the design. Thus, three design considerations must are taken into account. These considerations are:

1) hardware optimization for both RSA and ECC implementation with the best speed/resource trade off, 2) the amount of design/module reuse and hardware sharing of the two protocols, and 3) the asynchronous executing of the hardware modules in much higher speed than the processor communicating with it, i.e. heterogeneous processing.

The preferred embodiment of the present invention provides a compact crypto-engine capable of executing asymmetric cryptographic algorithms including both RSA and ECC protocols and has heterogeneous computation ability running at a higher internal clock speed.

Figure 1:
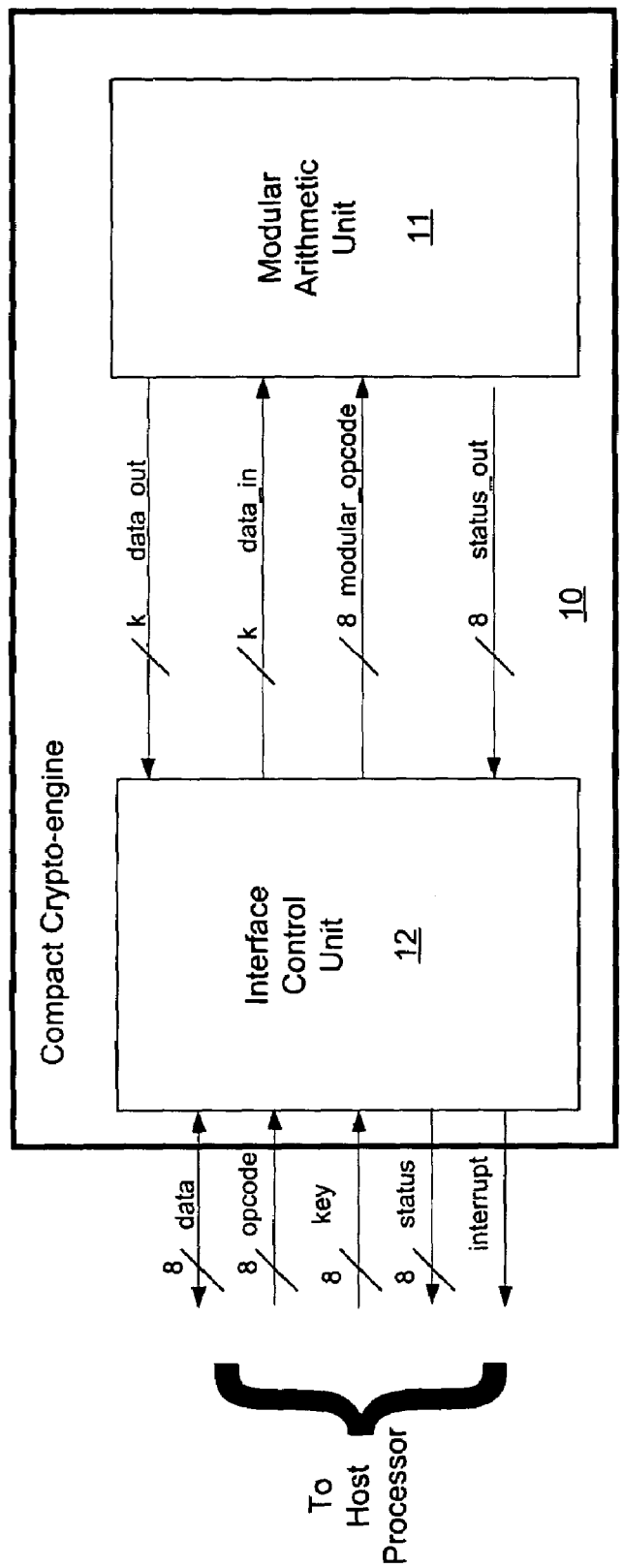
FIG. 1 is a block diagram of a compact crypto-engine for asymmetric cryptographic processing according to the invention.

Referring to FIG. 1, the preferred embodiment of a compact crypto-engine 10 comprises a Modular Arithmetic Unit (MAU) 11 and an Interface Control Unit (ICU) 12. The inputs and outputs of the ICU are provided from/to a host processor (not shown) such as a personal, network computer or Digital Signal Processor. The host processor provides an 8-bit 'data' transput (input and output) to and from ICU 12, and 8-bit 'key' and operation code ('opcode') inputs to ICU 12. The ICU 12 has an 8-bit 'status' and a 1-bit 'interrupt' output to signal the host processor. Communication between the ICU 12 and MAU 11 comprises a k-bit 'data_in' and a 8-bit 'modular_opcode' signals from the ICU 12 to the MAU 11, and a k-bit 'data_out' and a 8-bit 'status_out' signals from the MAU 11 to the ICU 12.

Figure 2:
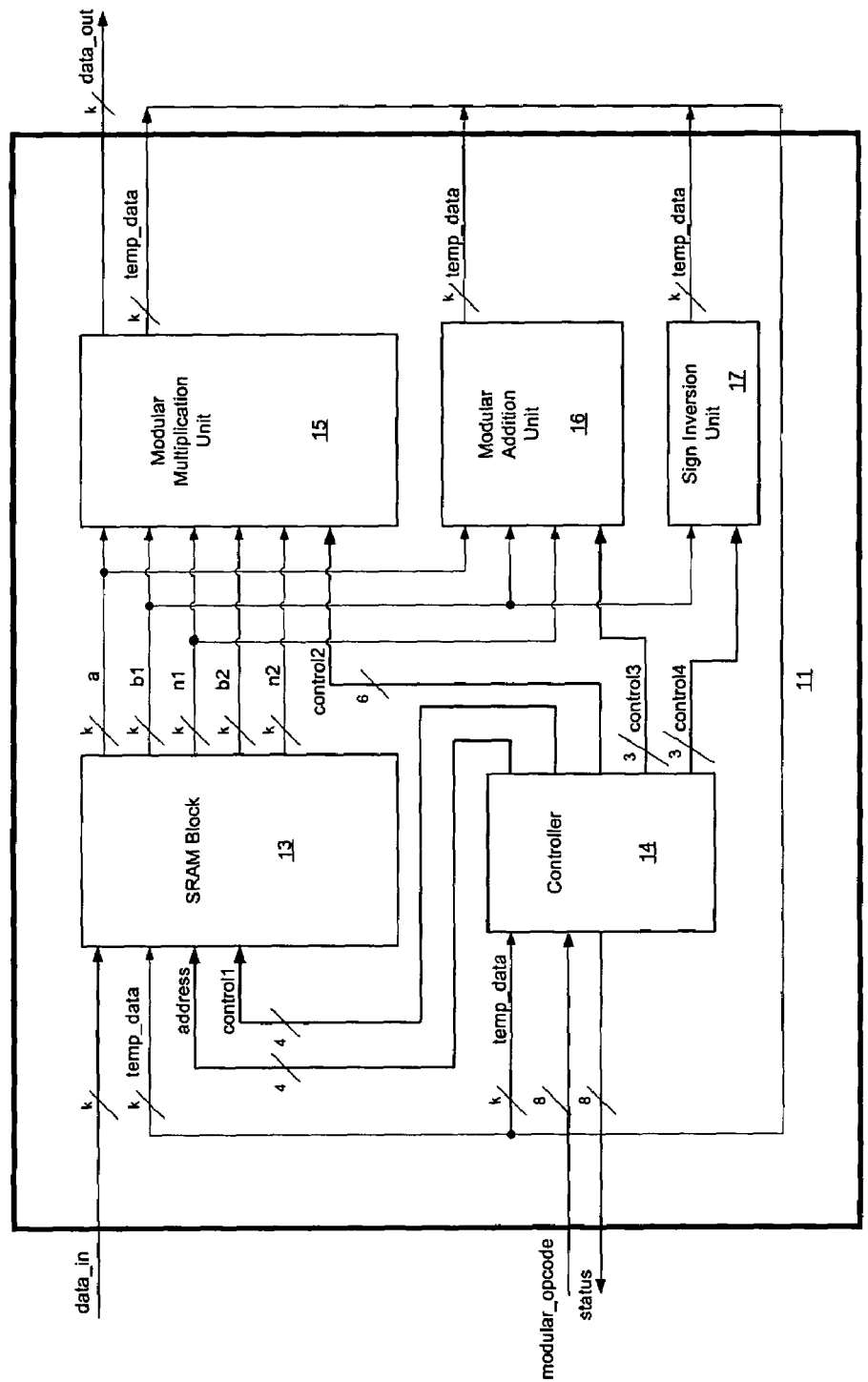
FIG. 2 is a block diagram of a modular arithmetic unit.

Referring to FIG. 2, the MAU 11 comprises an SRAM Block 13, a Controller 14, a Modular Multiplication Unit (MMU) 15, a Modular Addition Unit (MADU) 16 and a Sign Inversion Unit (SIU) 17. The outputs k-bit 'data_in' of ICU 12, k-bit 'temp_data' of MMU 15/MADU 16/SIU 17, 4-bit 'address' and 4-bit 'control1' of Controller 14 go into SRAM Block 13. The output k-bit 'a/b1/b2/n1/n2' of SRAM Block 13 goes to MMU 15. The output k-bit 'a/b1/n1' of SRAM Block 13 goes to MADU 16. The output k-bit 'b1' of SRAM Block 13 goes to SIU 17.

The outputs 8-bit 'modular_opcode' of ICU 12 and k-bit 'temp_data' of MMU 15/MADU 16/SIU 17 go to Controller 14. The outputs 4-bit 'address/control1' of Controller 14 goes to SRAM Block 13. The output 6-bit 'control2' goes to MMU 15. The output 3-bit 'control3' of Controller 14 goes to MADU 16. The output 3-bit 'control4' of Controller 14 goes to SIU 17. The 8-bit 'status_out' of Controller 14 goes to ICU 12. The outputs k-bit 'a/b1/b2/n1/n2' of SRAM Block 13 and 6-bit 'control2' of Controller 14 go to MMU 15. The output k-bit 'data_out' of MMU 15 goes to ICU 12 and the output k-bit 'temp_data' of MMU 15 goes to SRAM Block 13 and Controller 14.

The outputs k-bit 'a/b1/n1' of SRAM Block 13 and 3-bit 'control3' of Controller 14 go to MADU 16. The output k-bit 'temp_data' of MADU 16 go to SRAM Block 13 and Controller 14. The outputs k-bit 'b1' of SRAM Block 13 and 3-bit 'control4' of Controller 14 go to SIU 17. The output k-bit 'temp_data' of SIU 17 goes to SRAM Block 13 and Controller 14.

Figure 3:
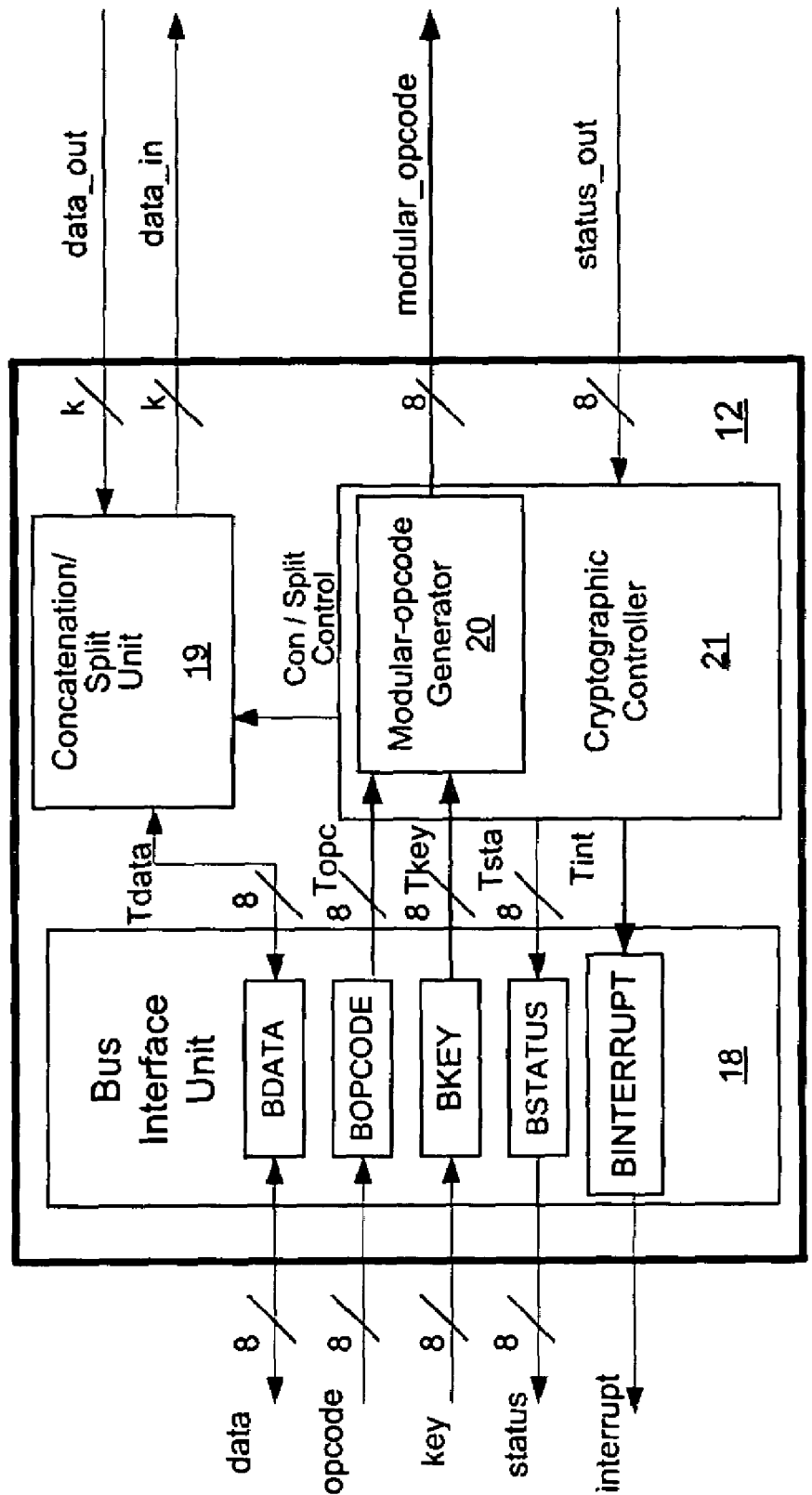
FIG. 3 is a block diagram of an interface control unit.

Referring to FIG. 3, the Interface Control Unit 11 comprises a Bus Interface Unit (BIU) 18, a Concatenation/Split Unit (CSU) 19 and a Modular-opcode Generator (MOG) 20 embedded into a Cryptographic Controller (CrC) 21. The 8-bit transput (input and output) 'data' of buffer BDATA in BIU 18 is provided to the host processor. The 8-bit outputs 'opcode' and 'key' from the host processor are provided to the buffer BOPCODE and BKEY respectively in the BIU 18. The 8-bit output 'status' and 1-bit output 'interrupt' of BSTATUS and BINTERRUPT in BIU 18 respectively are provided to the host processor. In the preferred embodiment, the ICU provides buffers to handle heterogeneous operation and the 'interrupt' signal to synchronize the data exchange. This allows the crypto-engine 10 to operate at a different clock speed to the host processor.

The 8-bit transput 'Tdata' of Buffer BDATA in BIU 18 is provided to the Concatenation/Split Unit 19. The 8-bit outputs 'Topc' and 'Tkey' of buffer BOPCODE and BKEY respectively in the BIU 18 are provided to the Modular-opcode Generator (MOG) 20 inside Cryptographic Controller (CrC) 21. The outputs 8-bit 'Tsta' and 1-bit 'Tint' generated from the 'status_out' signal in the CrC 21 are provided to the BIU 18. The k-bit output 'data_in' of Concatenation/Split Unit (CSU) 19, generated by cascading a sequence of 8-bit 'Tdata', is provided to MAU 11. The k-bit output 'data_out' of MAU 11, converted to a sequence of 8-bit 'Tdata', is provided to Concatenation/Split Unit (CSU) 19. The 8-bit output 'module_opcode' of MOG 20, generated from signals 'Topc' and 'Tkey', is provided to MAU 11. The 8-bit output 'status_out' of MAU 11 is provided to CrC 21 to generate the 8-bit 'Tsta' and 1-bit 'Tint' signals.

Figure 4:
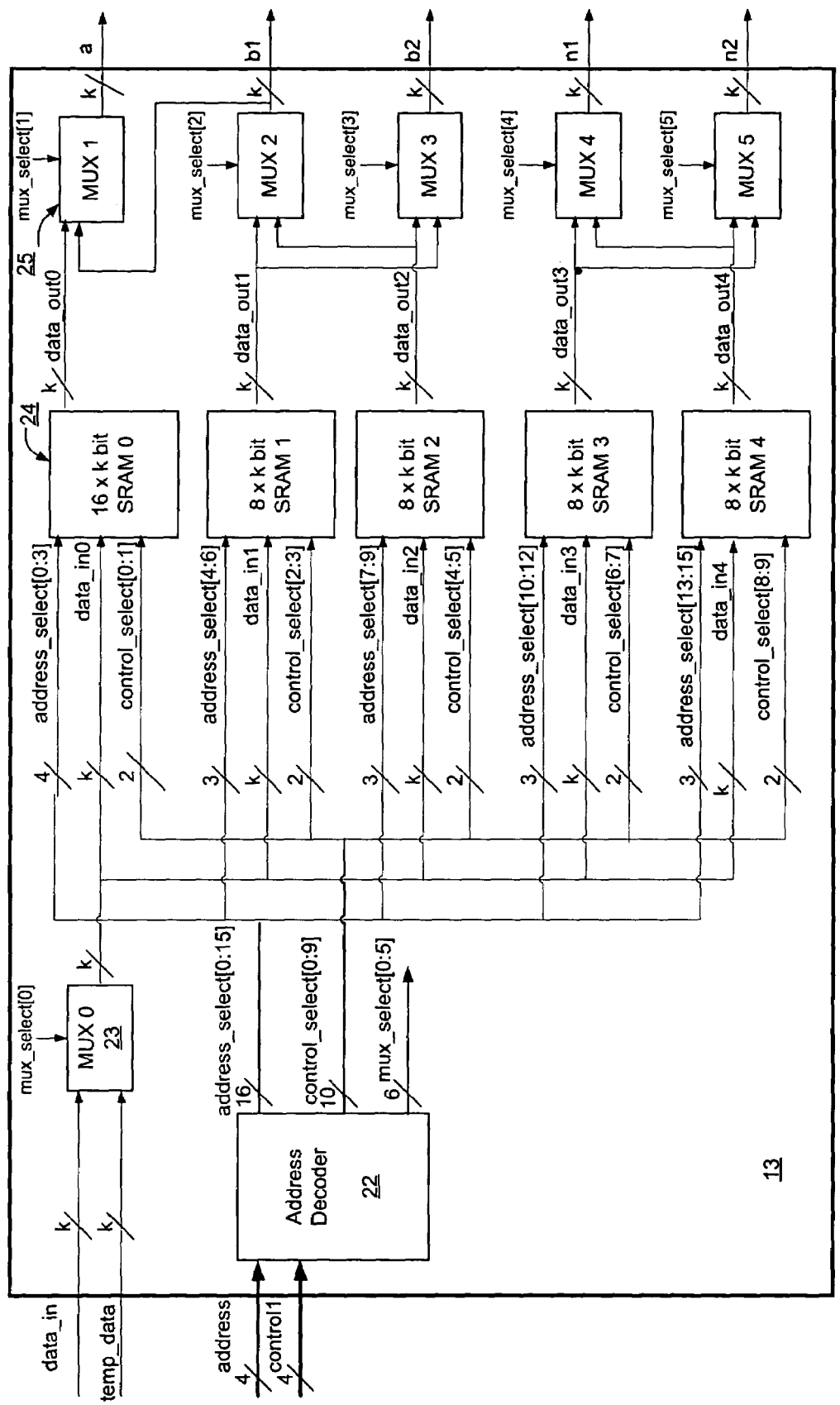
FIG. 4 is a block diagram of Static Random Access Memory (SRAM) Block.

Referring to FIG. 4, the Static Random Access Memory (SRAM) block 13 comprises an Address Decoder 22, a plurality of switches MUX0 23 and MUX1/MUX2/MUX3/MUX4/MUX5 25, a plurality of memory blocks 24 comprising one 16×k-bit SRAM0 and four 8×k-bit SRAM1/SRAM2/SRAM3/SRAM4/SRAM5. In the preferred embodiment there are a total of $3 \times 10^{24}$-bit SRAM blocks to store the 5 parameters 'a/b1/n1/b2/n2' for 1024-bit RSA modular multiplication in various stages or to store 192-bit ECC temporary data. The gate counts required for storing of interim manipulation results are substantially reduced.

To ameliorate the overflow problems that may be encountered during the modular multiplication calculation in MMU 15, a memory-size-expansion approach is adopted with according to the memory block size provided by Integrated Circuit fabrication supplier, say a 1152-bit memory for a 1024-bit manipulation.

Another preferred approach to overcome the overflow problem is to provide an "overflow control unit" with additional one bit for checking, say 1025-bit memory for 1024-bit manipulation.

Still referring to FIG. 4, the 4-bit outputs 'address' and 'control1' of Controller 14 are provided to Address Decoder 22 to generate one 16-bit 'address_select[0:15]' output, one 10-bit 'control_select[0:9]' output and one 6-bit 'mux_select [0:5]' output. The output first bit 'mux_select[0]' of Address Decoder 22 is provided to switch MUX0 23 to select either k-bit 'data_in' outputted by ICU 12 or k-bit 'temp_data' outputted by MMU 15/MAU 16/SIU 17. The outputs k-bit 'data_in 0', 'data_in1', 'data_in2', 'data_in3', and 'data_in4' of MUX0 23 are provided to SRAM0, SRAM1, SRAM2, SRAM3 and SRAM4 24 respectively.

The output 3-bit address_select[0:3], address_select[4:6], address_select [7:9], address_select [10:12] and address_select[13:15] of Address Decoder 22 is provided to SRAM0, SRAM1, SRAM2, SRAM3 and SRAM4 24 respectively. The output 2-bit control_select[0:1], control_select[2:3], control_select [4:5], control_select [6:7] and control_select[8:9] of Address Decoder 22 are provided to SRAM0, SRAM1, SRAM2, SRAM3 and SRAM4 24 respectively.

SRAM0, SRAM1, SRAM2, SRAM3 and SRAM4 receive respective signals 'address_select[0:15]', 'data_in 0'/'data_in1'/'data_in2'/'data_in3'/'data_in4' and 'control_select[0:9]' to generate respective k-bit outputs 'data_out0', 'data_out1', 'data_out2', 'data_out3' and 'data_out4'.

The 1-bit outputs 'mux_select[1]', 'mux_select[2]', 'mux_ select[3]', 'mux_select[4]'and 'mux_select[5]' of Address Decoder 22 control switches 25 to select between MUX1 inputs 'data_out0' or 'b1', MUX2 and MUX3 inputs 'data_out1' or 'data_out2' and MUX4 and MUX5 inputs 'data_out3' or 'data_out4'.

Referring to FIG. 2, the k-bit outputs 'a', 'b1', 'b2', 'n1' and 'n2' of switches 25 are provided to MMU 15; outputs 'a', 'b1' and 'n1' are provided to MAU 16; and output 'b1' is provided to SIU 17.

Figure 5:
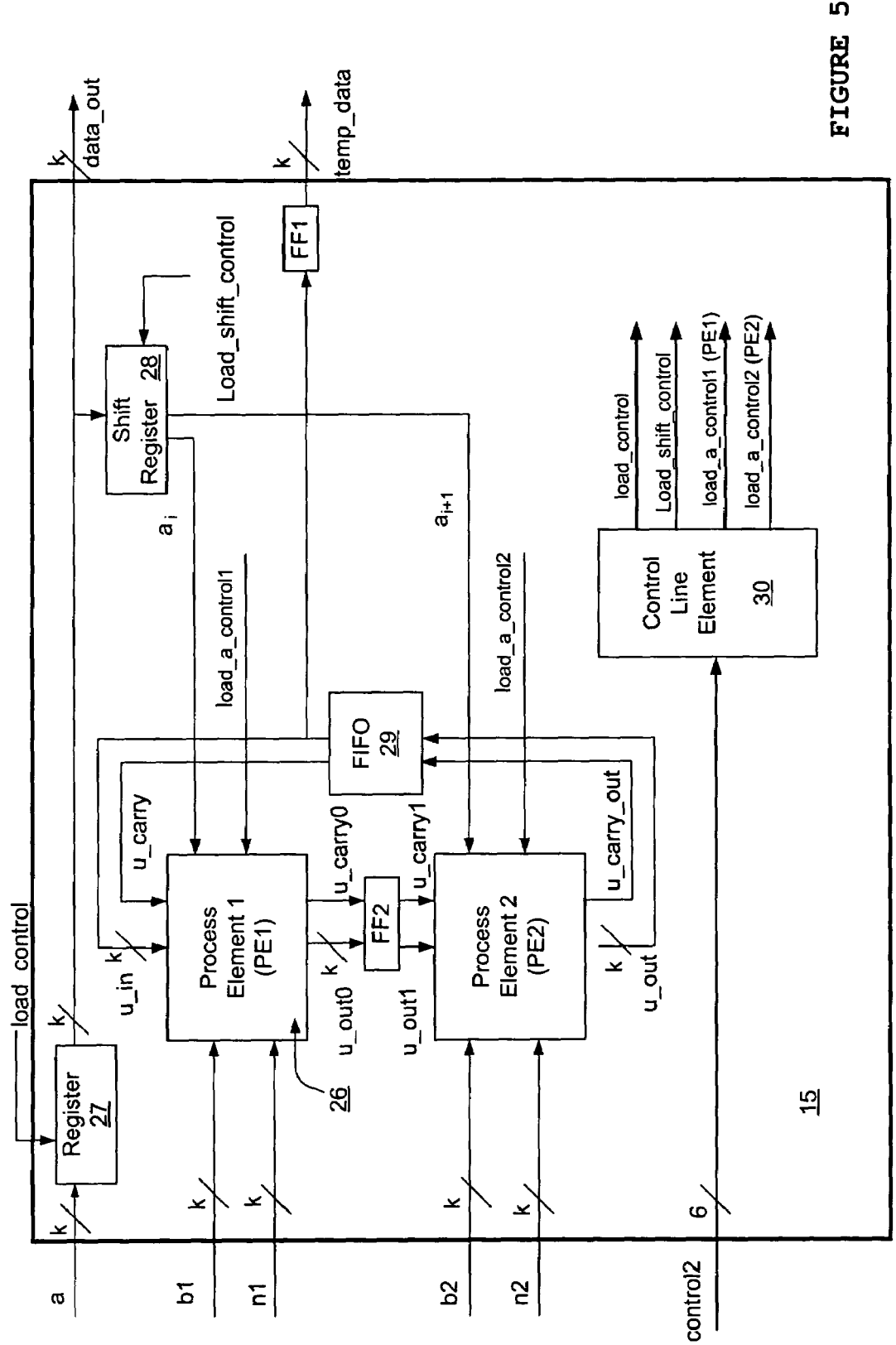
FIG. 5 is a block diagram of a modular multiplication unit.

Referring to FIG. 5, the Modular Multiplication Unit MMU 15 comprises a pair of Process Elements PE1 26 and PE2 link up with a Flop-flip (FF), a Register 27, a Shift Register 28, a First in First Out Flip-flop (FIFO) 29 and a Control Line Element (CLE) 30. The 6-bit output 'control2' of Controller 14 is provided to Control Line Element 30 and is decoded into a plurality of outputs 'load_control', 'load_shift_control', 'load_a_control1' (PE1) and 'load_a_control2' (PE2).

The k-bit output 'a' of SRAM Block 13 is provided to Register 27. The k-bit output 'data_out' of Register 27 is provided to Shift Register 28 and to ICU 12 when the output 'load_control' of CLE 30 is set.

The 1-bit outputs '$a_i$' and '$a_{i+1}$' of Shift Register 28 are provided to Process Element 1 (PE1) 26 and Process Element 2 (PE2) respectively when the output 'load_shift_control' of CLE 30 is set.

In the preferred embodiment the interim data 'U_out' and 'u_carry_out' are included with (k+1)-bit instead of normal (2×k)-bit for logic gate size (physical hardware size) reduction and the FIFO 29 is used as a delay line for the inputs k-bit 'u_out' and 1-bit 'u_carry_out' of PE2 to provide the inputs k-bit 'u_in' and 1-bit 'u_carry' of PE1. The k-bit output 'u_in' of FIFO 29 is provided to a Flip-flop (FF1) and the k-bit output 'temp_data' of FF1 is provided to SRAM Block 13.

The k-bit outputs 'b1' and 'n1' of SRAM Block 13, the outputs k-bit 'u_in' and 1-bit 'u_carry' of FIFO 29, the output '$a_i$' of Shift Register 28 and the outputs 1-bit 'load_a_control1' (PE1) of CLE 30 are provided to Process Element 1 (PE1) to generate the outputs k-bit 'u_out0' and 1-bit 'u_carry0'. The outputs k-bit 'u_out0' and 1-bit 'u_carry0' are provided to Flip-flop (FF2) to generate the outputs k-bit 'u_out1' and 1-bit 'u_carry1'.

The k-bit outputs 'b2' and 'n2' of SRAM Block 13, the outputs k-bit 'U_out1' and 1-bit 'u_carry1' of Flip-flop (FF2), the output '$a_{i+1}$' of Shift Register 28 and the outputs 1-bit 'load_a_control2' of CLE 30 are provided to Process Element 2 (PE2) to generate the outputs k-bit 'u_out' and 1-bit 'u_carry_out'. The outputs k-bit 'u_out' and 1-bit 'U_carry_out' are provided to FIFO 29 to generate the outputs k-bit 'u_min' and 1-bit 'u_carry'.

Figure 6:
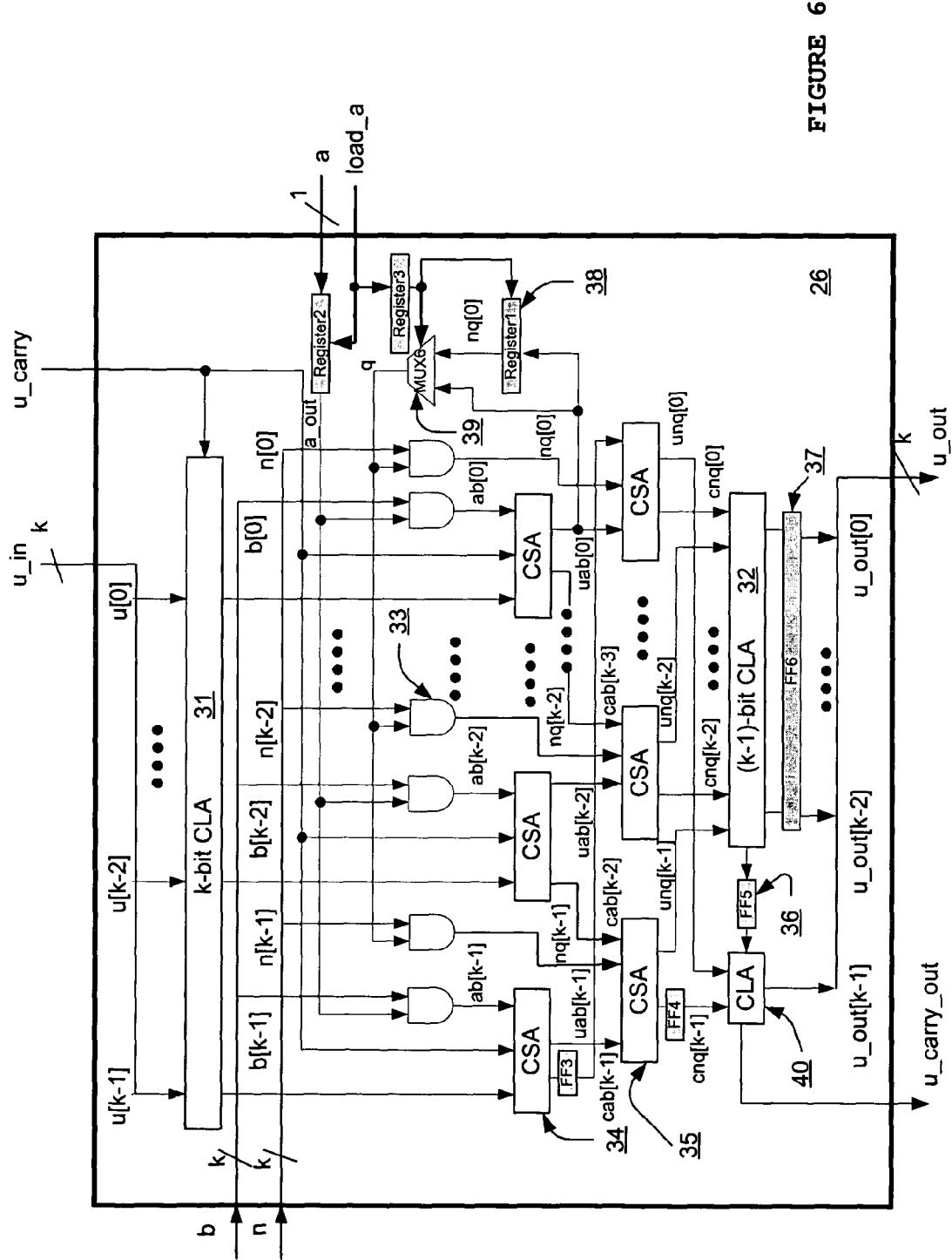
FIG. 6 is a block diagram of a processor element.

Referring to FIG. 6, the processor elements (PEs) implement Montgomery's multiplication to generate the modular multiplication. By defining $$A = \sum_{i=0}^{m-1} a_i 2^i, \quad B = \sum_{i=0}^{m-1} b_i 2^i; \quad N = \sum_{i=0}^{m-1} n_i 2^i \text{ and } U = \sum_{i=0}^{m-1} u_i 2^i$$

as the multiplier, multiplicand, modulo and modular product (result) respectively, for m bit integers where $\{a_i, b_i, n_i, u_i\} \in \{0,1\}$, the basic algorithm for Montgomery's multiplication is given as follows:

```
Module PE(A,B,U,N,m)
{U_-1 := 0;
for i = 0 to m do
    q_i := (U_{i-1} + a_i B) mod 2; //LSB of U_{i-1} = u_{0,i-1}
    U_i := (U_{i-1} + q_i N + a_i B) div 2
endfor
return U_m
}
```

In order to optimize the Process Element (PE) sizes for a compact hardware implementation, instead of full m-size PE elements, k-size (where m=e×k) PE pairs are included and parameters $A^j$, $B^j$, $N^j$ and $U^j$ are included where $$A = \sum_{j=0}^{e-1} A^j, \quad B = \sum_{j=0}^{e-1} B^j, \quad N = \sum_{j=0}^{e-1} N^j \text{ and } U = \sum_{j=0}^{e-1} U^j.$$

The algorithm is modified into:

```
//where superscripts = blocks, subscripts = bits and for
U_{i-1} = u_{0,i-1}, 0 is the first outer-loop.
    Module PE(A, B, U, N, m)
    {U_-1 := 0;
    for i = 0 to m do
    // q_i is implemented using MUX6 39 and CSA 34
        q_i := u_{0,i-1} + a_i b_0;
```

$$(u\_carry, U_i^0) = a_i B^0 + U_{i-1}^0; \quad \text{// implemented using CSA 34}$$
$$(u\_carry, U_i^0) = U_i^0 + q_i N^0 + u\_carry;$$

```
    for j = 1 to e - 1 do
```

// perform $(u\_carry, U_i^j) = a_i B^j + U_{i-1}^j + q_i N^j + u\_carry;$
// implement using CSA 34, i.e. $U_i^j = (a_i \& B^j) \oplus U_{i-1}^j \oplus u\_carry$
// u_carry = $(a_i \& B^j \& u\_carry) | (U_{i-1}^j \& u\_carry) | (a_i \& B^j \& U_{i-1}^j)$ // results store as (cab's, uab's)

$$(u\_carry, U_i^j) = a_i B^j + U_{i-1}^j + u\_carry;$$

// implement using CSA 35, i.e. $U_i^j = (q_i \& N^j) \oplus U_i^j \oplus u\_carry$
// u_carry = $(q_i \& N^j \& u\_carry) | (U_i^j \& u\_carry) | (q_i \& N^j \& U_i^j)$ // results store as (cnq's, unq's)

$$(u\_carry, U_i^j) = U_i^j + q_i N^j + u\_carry;$$

// concatenate the LSB of $U_j$ to MSB of $U_{j-1}$ as carry &

// $U_i^{j-1} := U_i^{j-1}$ div 2, implement using CLAs 32 and 49

// results store as (u_carry_out, u_out)

$$U_i^{j-1} := (u_{0,i}^j, U_{k-1...1}^{j-1});$$

```
    endfor

U_i^{(e-1)} := (u_carry, U_{k-1∧1}^{(e-1)})
    endfor
    Return U_m
    }
```

In the preferred embodiment the Process Element 26 and the modified algorithm include a k-bit Carry Look-ahead Adder (CLA) 31, a (k−1)-bit CLA 32, a plurality of AND gates 33, a plurality of Carry Save Adders (CSA) level 1 34 and level 2 35, a plurality of Flip-flops 36, a (k−1)-bit Flip-flop 37, registers 38, a Multiplexer MUX6 39 and a single CLA 40.

The outputs k-bit 'u_in' and 1-bit 'u_carry' of FIFO 29 are provided to a k-bit CLA 31 of Process Element 1 (PE1) 26. For Process Element 2 (PE2), the outputs k-bit 'u_out1' and 1-bit 'u_carry1' are provided to a k-bit CLA 31. The outputs k-bit 'b' (b1 or b2) of SRAM Block 13 and k-bit 'a_out' of Register1 are provided bitwise to a plurality of two-input AND gates 33. The outputs k-bit 'u[0:k−1]' of k-bit CLA 31, 1-bit 'u_carry' of FIFO 29 and 'ab[0:k−1]' of AND gates 33 are provided to level 1 CSA 34 to generate a plurality of add results 'uab[0:k−1]' and carry 'cab[0:k−1]'.

The outputs 1-bit 'q' of MUX6 and k-bit 'n' (n1 or n2) of SRAM Block 13 are provided to a plurality of AND gates to generate a k-bit output 'nq[0:k−1]'. The outputs k-bit 'nq[0:k−1]' of a plurality of AND gates 33, k-bit 'uab[0:k−1]'and k-bit 'cab[0:k−1]' are provided to level 2 CSA 35 bitwise to generate a plurality of add results 'unq[0:k−1]' and carry 'cnq[0:k−1]'. Preferably, the output 'cab[k−1]' goes through a Flip-flop (FF3) to bit-0 (of level 2) CSA 35.

The outputs k-bit 'unq[0:k−1]'and 'cnq[0:k−1]' of a plurality of CSAs 35 are provided to a (k−1)-bit CLA 32 and 1-bit CLA 40 to generate the outputs k-bit 'u_out' and 1-bit 'u_carry_out'. Preferably, the output 'cnq(k−1)' of CSA goes through a Flip-flop (FF4) to CLA 40 and the output carry of (k−1)-bit CLA 32 goes through a Flip-flop (FF5) 36 to CLA 40. Preferably, the outputs of (k−1)-bit CLA 32 go through a plurality of Flip-flops (FF6) 37 to generate the outputs 'u_out[0:k−2]' of 'u_out'.

The outputs 'uab[0]' of bit-0 CSA 34 and 1-bit delayed 'uab[0]' of Register1 38 are provided to MUX6 39 to give output 'q' according to condition of an output 'load_a' of CLE 30. The output 'q' of Register1 38 is generated according to the outputs 'uab[0]' of bit-0 CSA 34 and delayed 'load_a' from Register3 of CLE 30.

The outputs 1-bit 'load_a' of CLE 30 and 1-bit 'a' of Shift Register 28 are provided to Register2 to generate an output of 1-bit 'a_out'.

Embodiments of the invention have been implemented using 0.35 μm semiconductor technology. A total gate count of 15K for RSA and 20K for both RSA and ECC was utilized for k=64. The benchmark testing for a 1024 (1024-bit) RSA is summarized in Table 1 as follows with an internal clock of 22 MHz.

TABLE 1

Performance of various RSA operations

| Exponent | No. of '1's | No. of '0's | Modulus | Computation time |
|---|---|---|---|---|
| 17 bit[1] | 2 | 15 | 1024 bit | 7 ms |
| 1024 bit[2] | 512 | 512 | 1024 bit | 607 ms |

[1]The public key e = $2^{16}$ + 1 = 65537 is used.
[2]Average case, 1024-bit exponent, 50% '1', 50% '0' in binary representation.

The benchmark device is capable of running at 100 MHz where the computational time can be reduced to 0.18 seconds for the worst case scenario.

With the heterogeneous computation ability, the process can be executed in a much higher clock rate using phase lock clock multiplier to allow faster computational and thus transaction time.

A implementation example of an RSA coprocessor is based on four special function registers (SFRs) RSAD, RSAO, RSAS and RSAK in a host processor for controlling and monitoring the RSA coprocessor. A brief description of the SFRs now follows:

| RSA DATA (RSAD) Bit: | | | | | | | |
|---|---|---|---|---|---|---|---|
| 7 | 6 | 5 | 4 | 3 | 2 | 1 | 0 |
| RSAD.7 | RSAD.6 | RSAD.5 | RSAD.4 | RSAD.3 | RSAD.2 | RSAD.1 | RSAD.0 |

The bi-directional SFR is accessed via a mnemonic RSAD. Depending on the SFR RSAS, CPU and RSA coprocessor read from and write to this register. Data X, N and M are written at the beginning by software while Data M is read at the end by hardware. The RSAD is reset to 00h by a reset. There is unrestricted read/write access to this SFR.

| RSA OPCODE (RSAO) Bit: | | | | | | | |
|---|---|---|---|---|---|---|---|
| 7 | 6 | 5 | 4 | 3 | 2 | 1 | 0 |
| — | — | KEND | RST | WX | WN | RWM | RW |

The RSA Opcode Register with mnemonic RSAO receives instructions to configure the operation of the RSA coprocessor. This byte is set or cleared by software for the following purpose.

| | |
|---|---|
| KEND | Key End: This bit is set to tell the coprocessor the key writing is finished. |
| RST | Reset: This bit is set to reset the coprocessor synchronously. |
| WX | Write Precomputation Constant X: When this bit and RW are set, 128 bytes of data X are written into the coprocessor. When this bit is cleared, data X will not be written. |
| WN | Write Modulus N: When this bit and RW are set, 128 bytes of data N are written into the coprocessor. When this bit is cleared, data N will not be written. |
| RWM | Read Write Message M: When this bit and RW are set, 128 bytes of data M are written into the coprocessor. When this bit is set while RW is cleared, 128 bytes of data M are read from the coprocessor. When this bit is cleared, data M will not be read or written. |
| RW | Read Write Control: When this bit is set, data X, N, M will be written depends on bits WX, WN, RWM. When cleared, 128 bytes of data M are read from the coprocessor if RWM is set. |

All possible combination of read/write operation:
WN
RWM
RW
Read/Write Operation
1
0
0
1
Write data X
0
1

0
1
Write data N
0
0
1
1
Write data M
1
1
0
1
Write data X and N
1
0
1
1
Write data X and M
0
1
1
1
Write data N and M
1
1
1
1
Write data X, N and M
X
X
1
0
Read data M
X
X
0
0
No operation
0
0
0
X
No operation The RSAO is reset to 00h by a reset. There is unrestricted read/write access to this SFR.

| RSA STATUS (RSAS) Bit: | | | | | | | |
|---|---|---|---|---|---|---|---|
| 7 | 6 | 5 | 4 | 3 | 2 | 1 | 0 |
| — | — | — | — | WKR | — | RMR | — |

The status with mnemonic RSAS of the RSA coprocessor is expected to shown in the RSA Status Register. This byte is set or clear by hardware for the following purpose.

| | |
|---|---|
| WKR | Write Key Request: This bit is set to request the CPU to write the next byte of key to the SFR RSAK. |
| RMR | Read Message Request: This bit is set to tell the CPU that the RSA operation is finish and it is ready to read the data M. It also requests the CPU to write instruction to read data M from RSAD. |

The RSAS is reset to 00h by a reset.
There is restricted read only access to this SFR.

| RSA KEY (RSAK) Bit: | | | | | | | |
|---|---|---|---|---|---|---|---|
| 7 | 6 | 5 | 4 | 3 | 2 | 1 | 0 |
| RSAK.7 | RSAK.6 | RSAK.5 | RSAK.4 | RSAK.3 | RSAK.2 | RSAK.1 | RSAK.0 |

The SFR with mnemonic RSAK will be used to store the key. One byte of RSA key, i.e. the exponent e or d is written into this register by software, while the bit WKR of the SFR RSAS is set. The RSAK is reset to 00h by a reset. There is unrestricted read/write access to this SFR.

Figure 7:
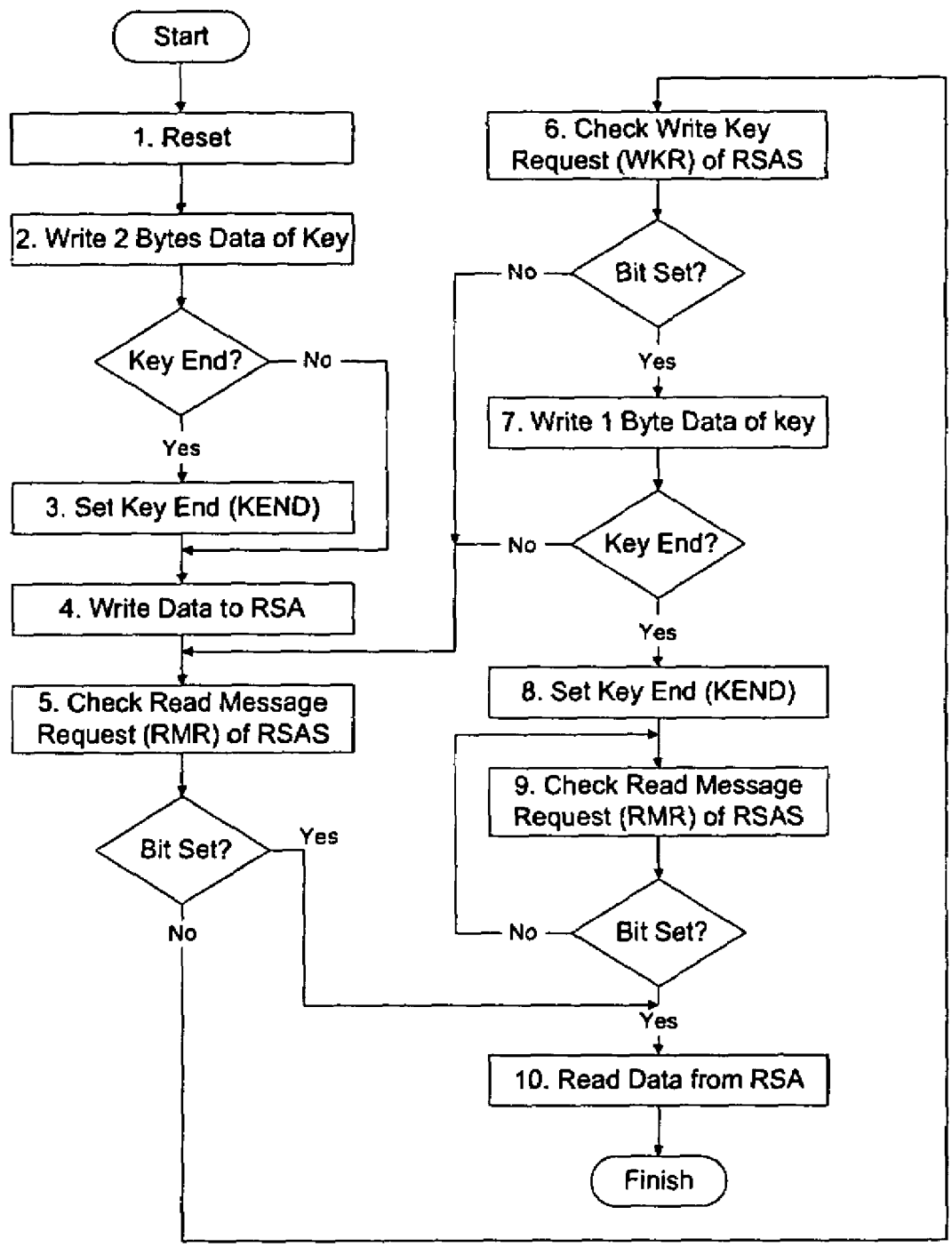
FIG. 7 is a flow diagram of RSA implementation example using polling mode.
Figure 8:
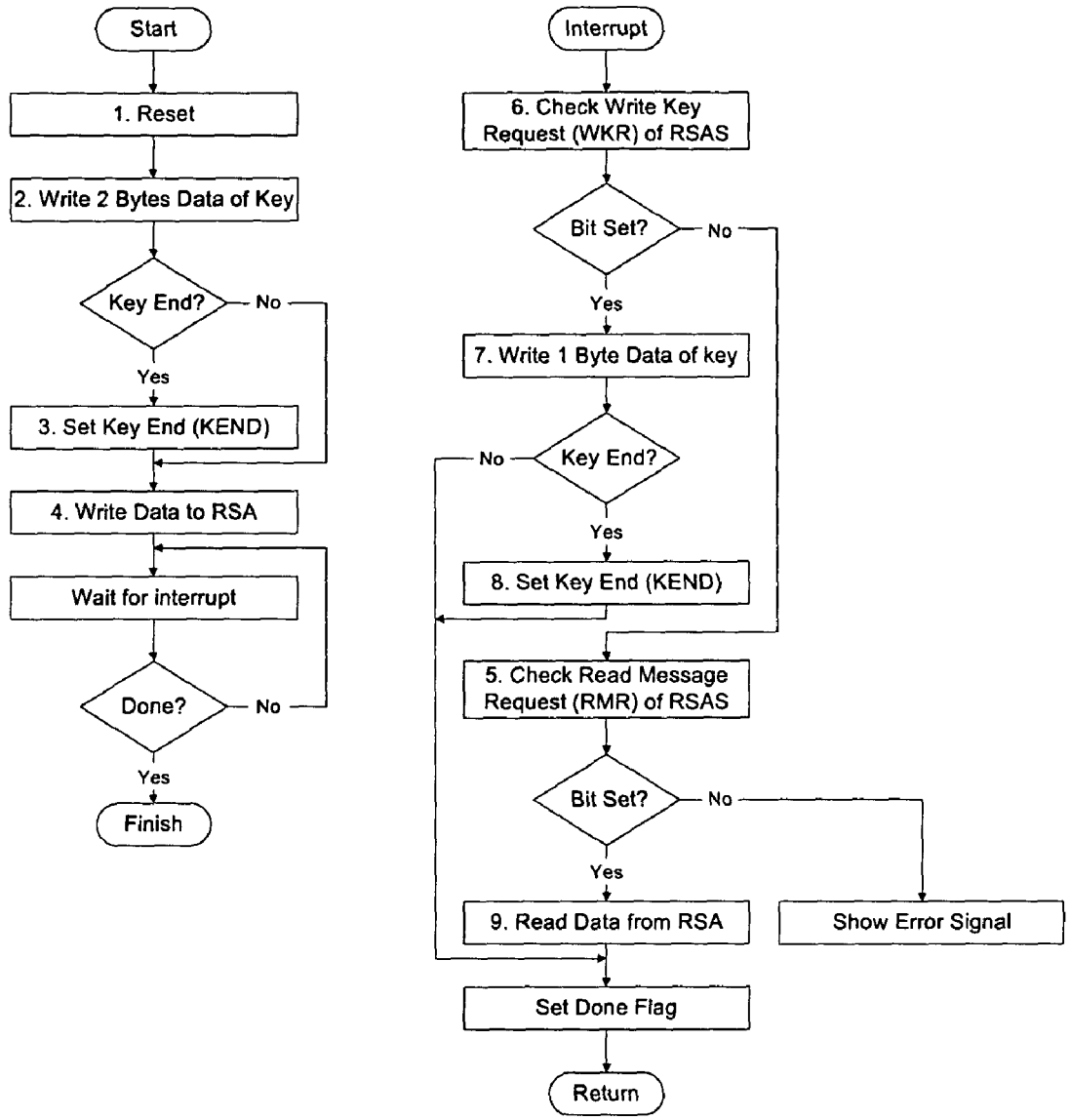
FIG. 8 is a flow diagram of an RSA implementation example using interrupt mode.

The procedure of control the RSA coprocessor to carry out a RSA operation is summarized in FIGS. 7 and 8. The sequence of operation is as follows:

1. The coprocessor must be reset at the beginning of RSA operation; the Reset (RST) bit is set (RSAO=10h) and cleared (RSAO=00h) to reset the coprocessor.

2. Two bytes of RSA key are then written to RSAK, starting from the most significant byte.

3. If the key ends, i.e. the key is less than or equal to 2 bytes, set the bit KEND of RSAO (RSAO=20h) to inform the coprocessor.

4. Set the Write operation by setting appropriate bits in RSAO, followed by writing the data block(s) in the order of data X, N and M into RSAD, starting from the least significant byte of first data block. For example, if RSAO=0Fh, 3×128 bytes of data X, N, and M are written to RSAD sequentially, starting from the least significant byte of data X; If RSAO=0Bh, 2×128 bytes of data X and M are written to RSAD sequentially, starting from the least significant byte of data X; If RSAO=09h, only 128 bytes of data X is written to RSAD, starting from the least significant byte of data X.

5. Check the WKR of RSAS to see whether the RSA coprocessor request next byte of key.

6. If the WKR is set, write one byte of key to RSAK.

7. If the key ends, i.e. all bytes of key is written into RSAK, set the bit KEND of RSAO (RSAO=20h) to inform the coprocessor.

8. Check the RMR to see whether the result data is ready to be read.

9. When it is ready to read the data, the read data M instruction is assigned to the RSAO (RSAO=02h). 128 bytes of data M are read from RSAD, starting from the least significant byte of data M.

Where in the foregoing description reference has been made to methods or elements have known equivalents then such are included as if individually set forth herein.

Embodiments of the invention have been described, however it is understood that variations, improvement or modifi-

What is claimed is:

1. A crypto-engine for cryptographic processing of data comprising an arithmetic unit operable as a co-processor for a host processor and an interface controller for managing communications between the arithmetic unit and host processor, the arithmetic unit including:
   a memory unit for storing and loading data, the memory unit including
      an input switch for selecting input-interim data;
      a plurality of Static Random Access Memory elements for receiving and storing the input/interim data from the input switch;
      a plurality of output switches connected to the memory elements; and
      an address controller for controlling flow of the data through the switches and memory elements
   a multiplication unit, an addition unit and a sign inversion unit for performing arithmetic operations on said data, the multiplication unit, the addition unit and the sign inversion unit each having an output; and
   an arithmetic controller for controlling the storing and loading of data by the memory unit and for enabling the multiplication, addition and sign inversion units;
   wherein the outputs of the multiplication unit, the addition unit and the sign inversion unit are feedback to the arithmetic controller.

2. The crypto-engine of claim 1 wherein the multiplication unit comprises:
   a register to pre-store the multiplier data;
   a pair of multiplication elements for performing multiplication;
   a shift register to load the multiplier data bitwise into the multiplication elements; and
   a first-in-first-out register for synchronizing data movement between the multiplication elements.

3. The crypto-engine of claim 2 wherein the multiplication elements comprise a bitwise segmented multiplier, a bitwise segmented multiplicand, and a modulo for performing modular multiplication of the multiplier and multiplicand according to the modulo value.

4. A crypto-engine for cryptographic processing of data comprising an arithmetic unit operable as a co-processor for a host processor and an interface controller for managing communications between the arithmetic unit and host processor,
   the arithmetic unit including:
      a memory unit for storing and loading data;
      a multiplication unit, an addition unit and a sign inversion unit for performing arithmetic operations on said data, the multiplication unit, addition unit and sign inversion unit each having an output; and
      an arithmetic controller for controlling the storing and loading of data by the memory unit and for enabling the multiplication, addition and sign inversion units, wherein the outputs of the multiplication unit, an addition unit and a sign inversion unit are feedback to the arithmetic controller;
   the interface controller including:
      a bus interface for connecting high frequency manipulated data inside the arithmetic unit with the lower frequency manipulated data in the host processor;
      a concatenater/splitter for merging or splitting data width, and
      a cryptographic controller generating status and interrupt signals for the host processor and generating an op-code signal for the arithmetic unit, the arithmetic unit selecting RSA or EGO modes of operation based on the op-code signal.

5. The crypto-engine of claim 4 wherein the multiplication unit comprises:
   a register to pre-store the multiplier data;
   a pair of multiplication elements for performing multiplication;
   a shift register to load the multiplier data bitwise into the multiplication elements; and
   a first-in-first-out register for synchronizing data movement between the multiplication elements.

6. The crypto-engine of claim 5 wherein the multiplication elements comprise a bitwise segmented multiplier, a bitwise segmented multiplicand, and a modulo for performing modular multiplication of the multiplier and multiplicand according to the modulo value.

7. The crypto-engine of claim 5 wherein the memory unit has a size substantially equal to 384 bytes and the sign inversion unit has a k-size substantially equal to 64 bits.

8. The crypto-engine of claim 1 wherein the outputs of the multiplication unit, the addition unit and the sign inversion unit are feedback to the arithmetic controller and the memory unit.

9. The crypto-engine of claim 4 wherein the memory unit has a size substantially equal to 384 bytes and the sign inversion unit has a k-size substantially equal to 64 bits.

10. The crypto-engine of claim 4 wherein the multiplication unit, the addition unit and the sign inversion unit each having an output that is feedback to the arithmetic controller.

11. The crypto-engine of claim 10 wherein the outputs of the multiplication unit, the addition unit and the sign inversion unit are feedback to the arithmetic controller and the memory unit.

* * * * *

UNITED STATES PATENT AND TRADEMARK OFFICE
CERTIFICATE OF CORRECTION

PATENT NO. : 7,634,666 B2
APPLICATION NO. : 10/641869
DATED : December 15, 2009
INVENTOR(S) : Cheng et al.

It is certified that error appears in the above-identified patent and that said Letters Patent is hereby corrected as shown below:

Column 12:
Line 18, delete "EGO" and substitute --ECC--.

Line 25, delete "registerto" and substitute --register to--.

Line 34, delete "claim 5" and substitute --claim 1--.

Signed and Sealed this

Thirtieth Day of March, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,634,666 B2 |
| APPLICATION NO. | : 10/641869 |
| DATED | : December 15, 2009 |
| INVENTOR(S) | : Cheng et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this

Ninth Day of November, 2010

David J. Kappos
*Director of the United States Patent and Trademark Office*